F. B. KENDALL.
Cultivator.
No. 214,825. Patented April 29, 1879.
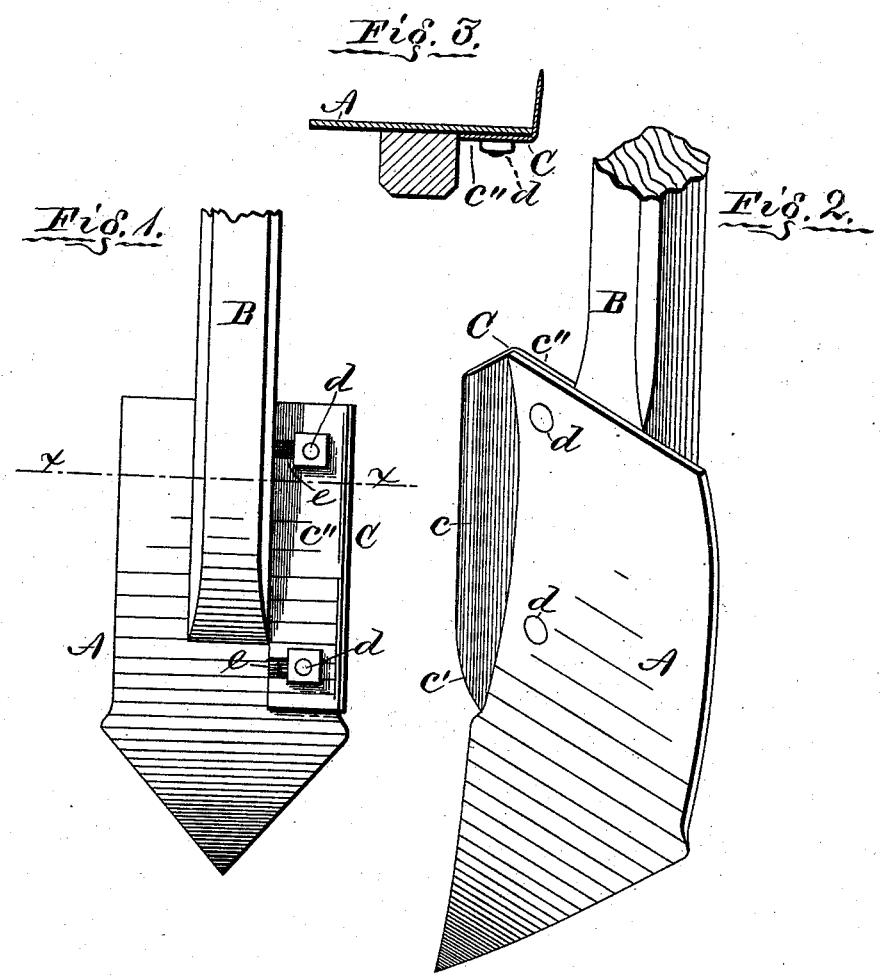

UNITED STATES PATENT OFFICE.

FRANCIS B. KENDALL, OF MONMOUTH, ILLINOIS.

IMPROVEMENT IN CULTIVATORS.

Specification forming part of Letters Patent No. 214,825, dated April 29, 1879; application filed August 12, 1878.

*To all whom it may concern:*

Be it known that I, FRANCIS B. KENDALL, of Monmouth, in the county of Warren and State of Illinois, have invented certain new and useful Improvements in Cultivators; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a rear elevation of a cultivator-plow shovel with my improved fender attached. Fig. 2 is a perspective view. Fig. 3 is a horizontal sectional view in the line $x\ x$ in Fig. 1.

This invention relates to improvements in cultivator-plows; and consists in certain improvements therein, as hereinafter more fully set forth.

Referring to the drawings by letters, the same letter indicating the same part wherever used, letter A represents an ordinary cultivator-shovel attached to an ordinary cultivator-shovel standard, B. C represents my fender, formed of thin metal or any other suitable material, and has a forward-projecting side, $c$, with a lower rounded front edge, $c'$, and a rear side, $c''$, which is bent at right angles to the side $c$, and is adapted to fit the rear side of the shovel A.

The fender C is placed on the shovel A, as shown in the drawings, with the side $c''$ resting against the rear side of the shovel A, and the side $c$ extending forward. Bolts $d$ are then inserted through the shovel A and slots $e$ in the side $c''$ of the fender to secure the fender in place.

It will be seen that the fender may be adjusted laterally in relation to the shovel A by loosening the nuts on the bolts $d$, or that the fender may be removed and replaced in the same manner.

The fender is bolted to that side of the shovel which goes next the plants in cultivating them, and will prevent the soil which is forced upward on the front side of the shovel from falling over from that side of the shovel and onto the plants, and thus permit running the shovels very close to small plants without danger of crushing or covering them with the loose soil.

I am aware that a fender attached to the mold-board of a plow, and having teeth at its outer end and capable of a lateral adjustment, has heretofore been employed; and I am also aware that a fender-plate attached by an arm to the beam of a cultivator, said fender lying in a vertical plane near one edge of a cultivator-tooth, has heretofore been employed, and I therefore lay no claim to such inventions.

What I claim as new is—

The combination, with the shovel A, of the fender C, having the upwardly-projecting side $c$, with the rounded front edge, $c'$, and the bottom face, $c''$, bent at right angles to the side $c$, embracing the lower face of the shovel, and provided with the open slots $e$, and the bolts $d$, provided with nuts, the whole constructed and arranged to operate in the manner and for the purpose set forth.

In testimony that I claim the foregoing as my own I affix my signature in presence of two witnesses.

FRANCIS B. KENDALL.

Witnesses:
W. J. WALKER,
JOHN T. MORGAN.